Aug. 8, 1967  C. M. LADD  3,334,749
FILTERING STRUCTURE
Filed Nov. 7, 1966  2 Sheets-Sheet 1

INVENTOR.
CHARLES M. LADD
BY Benjamin W. Colman
ATTORNEY

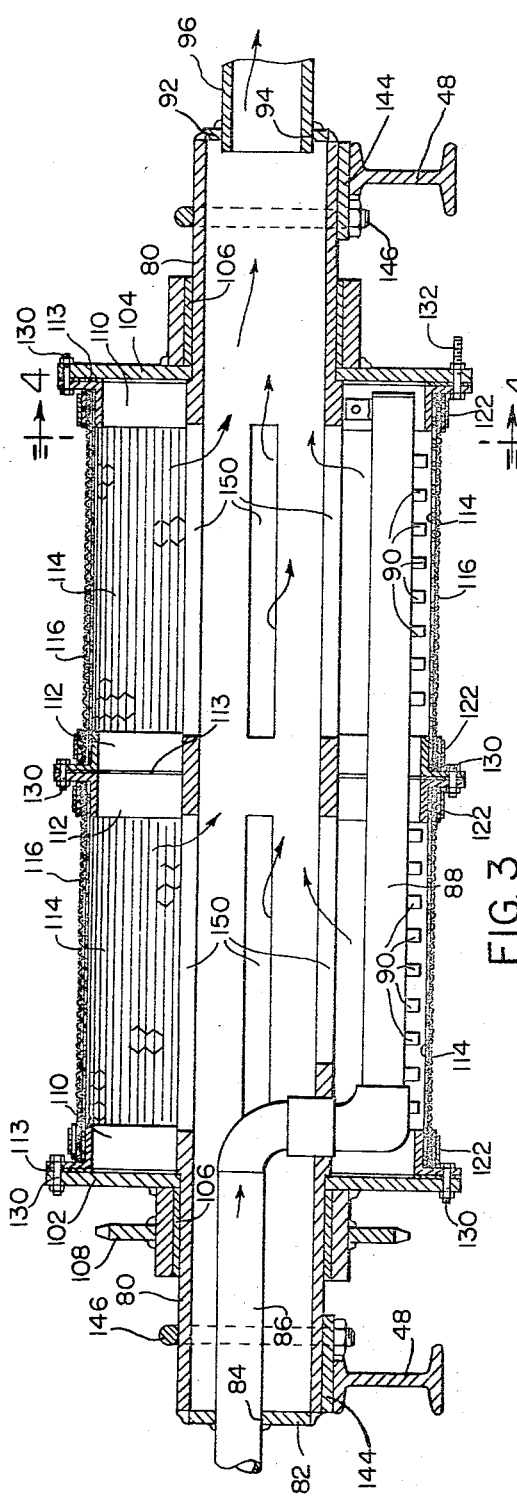
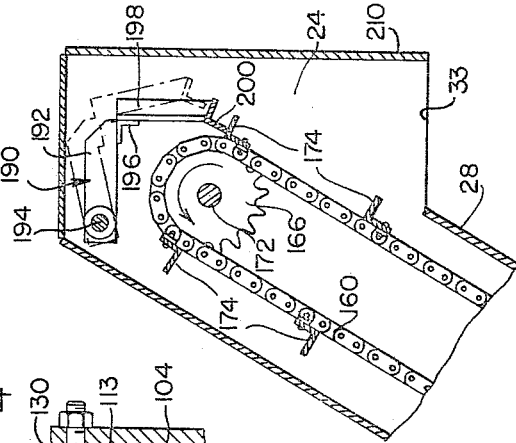
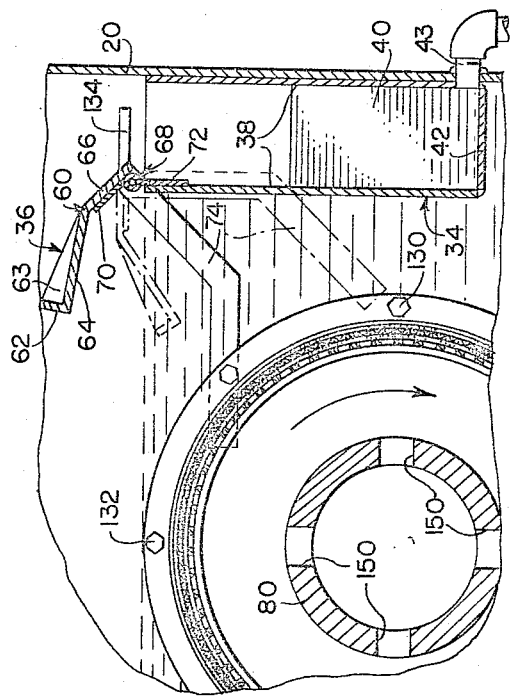

3,334,749
FILTERING STRUCTURE
Charles M. Ladd, 14180 Garfield Ave., Detroit, Mich. 48239
Filed Nov. 7, 1966, Ser. No. 592,623
17 Claims. (Cl. 210—145)

This invention pertains to a filtering structure, and more particularly to a filtering tank device including a rotatable filter operating under suction and including a discharge mechanism for removing solids from the tank in which the filter is located, in a continuous filtration operation.

The invention involves a filter tank, a scraping mechanism for removing solids which deposit on the bottom of the tank, a filter device, and a skimming device associated with the filter for removing contaminating matter floating on the level of the liquid in the tank.

One of the objects of the invention is to provide a filtering structure in which surface-floating contaminants and solids in the liquid to be filtered are removed simultaneously and automatically. Another object is to provide a filter structure so designed that the amounts of contaminating material approaching the filter screen is reduced by operation of a surface skimming device associated with the filter. A further object is to provide a continuous filtration system with periodic automatic removal of surface floating contaminants, thereby reducing the amount of such material which approaches the filter screen. Yet another object is to provide a filter structure with a screen blow-off device adapted to automatically and continuously remove such contaminating matter as may adhere to the outer surface of the filtering screen and to cause such matter to be removed to a distance from the screen and, if sufficiently dense, to drop to the bottom of the tank. Still another object is to provide a solids removing mechanism for scraping solids deposited on the bottom of the tank to a discharge point of the tank, the blades of the scrapers being automatically wiped at the discharge position. A further object is to provide a filtering structure which is highly efficient and maintenance free under severe conditions of operation, composed of a minimum of moving parts and controls, economical, and practical for use in high production operations requiring the filtering of large volumes of liquid of the order from about one hundred to about one thousand gallons of filtrate per minute, but without restriction to this range of filter output.

These and additional objects of the invention and features of construction will become more readily apparent from the description given below of an illustrative example of a device embodying the inventive concept. The terms employed are used for purposes of description and not of limitation. Reference is now made to the drawings annexed hereto and forming an integral part of this specification, and in which FIGURE 1 is a side elevational view of a filtering structure embodying the inventive concept, with a portion of a side wall broken away to show the filter unit and solids scraping mechanism in elevation.

FIGURE 3 is a longitudinally extending vertical sectional view through the filter unit of the structure illustrated in FIGURE 1.

FIGURE 4 is a fragmentary transverse vertical sectional view taken through a portion of the filter shown in FIGURE 3, showing the adjacent skimmer and catch pan, taken substantially on the line 4—4 of FIGURE 3.

FIGURE 5 is a fragmentary vertical sectional view taken substantially at the right end of FIGURE 1 and showing the chip drag conveyor and solids scraper arrangement adjacent the discharge opening of the tank unit.

FIGURE 6 is an enlarged fragmentary vertical sectional view of the filter unit at a hubbed end plate, taken at the upper right corner of the unit shown in FIGURE 3.

Figure 1:
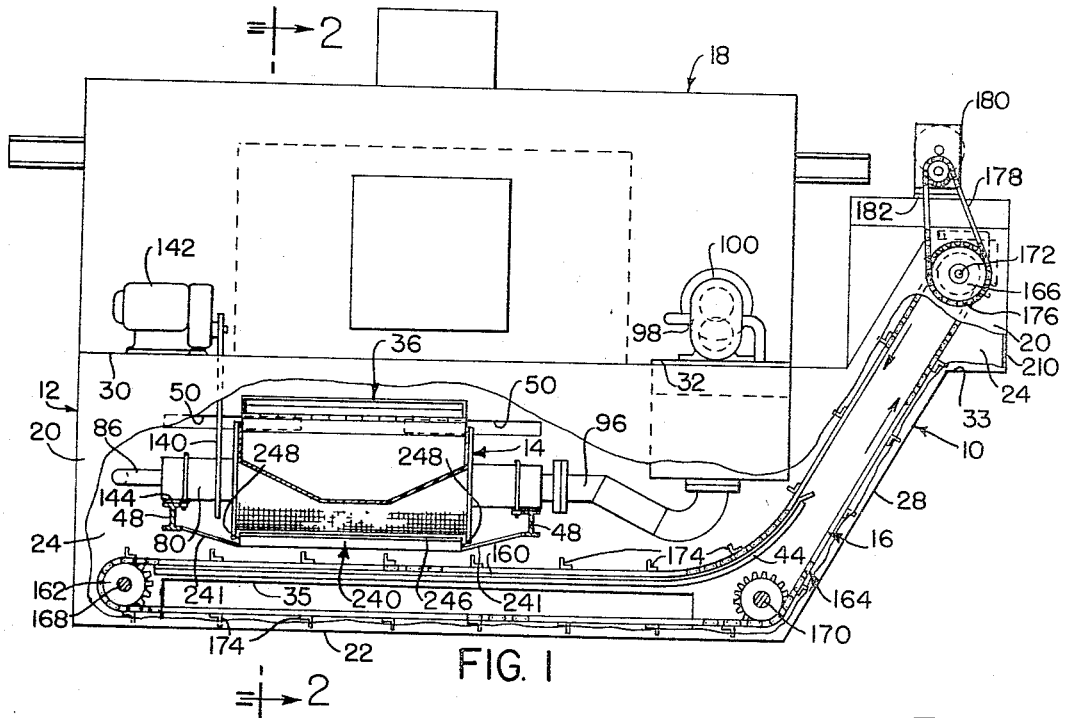
Figure 2:
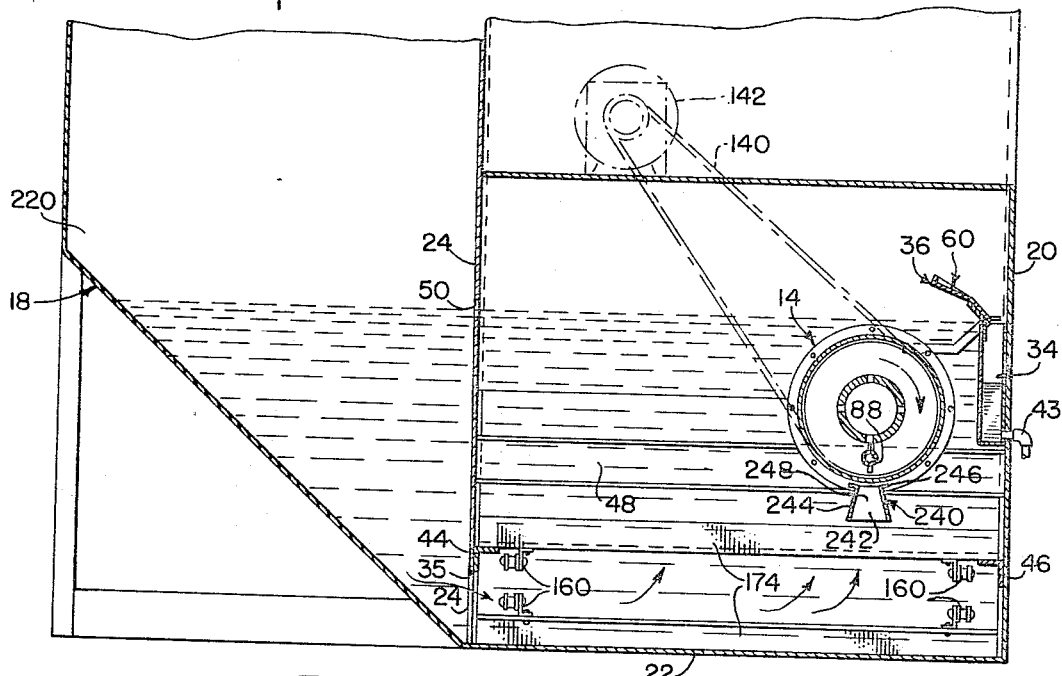
FIGURE 2 is a transverse vertical sectional view of the device illustrated in FIGURE 1, taken substantially on line 2—2 of FIGURE 1.

One embodiment of the filtering structure 10 of this invention is illustrated in the drawings and comprises a tank unit 12, a filter unit 14, and a chip drag conveyor and scraper mechanism 16. Although the tank unit is illustrated in conjunction with a conveyorized washing chamber for industrial parts, it is to be understood that the filtering structure 10 can be fabricated as a completely independent unit, or can be associated with a device supplying liquid to be filtered to the tank unit, or can be built, as shown, in conjunction with a device directly providing such liquid to be filtered. The general reference numeral 18 is applied to such associated or conjoined device, which in this instance is a conveyorized parts washing chamber.

The tank unit 12 comprises an exterior side wall 20, a bottom plate 22, an interior side wall plate 24, an end plate 26, and an angularly disposed end plate 28. Adjacent one end of the tank is a motor drive support 30 for the filter disposed in elevated position above the liquid level of the tank, and a pump and drive support 32 secured to the tank walls adjacent the chip drag conveyor discharge opening 33. Secured to the front wall 20 is an open topped trough 34 to receive the discharge of surface floated contaminants from the skimming device 36. The trough 34 is composed of lateral side walls 38, 38, one of which is fixedly secured to the tank side wall 20 by welding or other suitable means, end walls 40 and a bottom wall 42, all secured together, preferably by welding, into a liquid-tight vessel. A drain conduit 43 communicating through the tank side wall 20 and the lateral wall 38 of trough 34 provides means for discharging accumulated liquid and contaminants collected by the trough. The trough 34 has its end walls 40 and side walls 38 formed into a hopper bottom so that the collected contaminants and entrained liquid flow toward the exit drain conduit 43.

The inside tank lateral wall 24, in the construction illustrated, is provided with a bottom opening 35, intermediate end portions of the wall 24, adjacent the tank wall bottom 22, providing an entry for liquid from the chamber 18 into the tank unit 12. Longitudinally extending angle supports 44, 44 are secured to and adjacent the bottom edge of wall 24, and a similar angle support 46 is arranged in parallel therewith and secured to the front wall 20, to provide a longitudinally extending pair of support rails for the chip drag conveyor flights which will be described more particularly below. A pair of transversely-extending beams 48, 48 are secured to the lateral tank walls 20 and 24 to provide support for the filter unit 14.

To remove floating contaminants, such as oil, solids, etc., from the liquid surface in washer unit 18, a pair of slots 50, 50 in the wall 24 are positioned toward each end of the wall, the slots extending approximately 1″ below and 1″ above the predetermined and relatively constant liquid level in the tank unit 12. The flow pattern caused by the operation of filter unit 14 being under suction will cause a movement of liquid through the slots 50, 50 to the filter unit and present the surface floating contaminants to the skimmer device 36. The main flow of liquid will be from the tank of the washer unit 18 downwardly through opening 35, which will deposit the heavier solid particles into the chip drag conveyor area. Bottom opening 35 is designed as a velocity slot, insuring a high speed flow of liquid so as to remove the heavy particles from the washer unit tank and carry them to the chip drag area.

A liquid level float control and a source of fresh water, neither of these being shown in the drawings, are provided in the tank unit 12 to maintain the liquid depth, regardless of the wash liquid received from the washer unit 18, at a predetermined relatively constant level. This is desirable in view of the continuous filtration process of the structure herein disclosed.

The capacity of tank unit 12 is at least three times that of the operating pump capacity associated with the filter unit 14, and a ratio at least that or greater is preferred.

The skimmer structure 36 comprises a plate member 60 having a lip 62, and panels 63, one portion 64 of the plate 60 being angled from the portion 66, so that the lip 62 and portion 64 form a dipper adapted to go below the level of the liquid and to scoop or skim contaminants floating upon the liquid as the skimmer rises and to discharge such contaminants and entrained liquid into the trough 34. A hinge 68 has one leaf 70 secured to the plate portion 66, and the other leaf 72 secured to the interior wall 38 of the trough 34, so that the skimmer plate 60 is arranged for rotation on the horizontal axis of the hinge 68. Secured to the plate 60 is an angled elongated arm or lever 74 extending toward one end of the filter device 14 for engagement therewith, as will be disclosed and described more fully below.

The filter unit 14 comprises a tubular support 80 having an end plate 82 at one end thereof (the left end in FIGURE 3), the end plate forming a liquid-tight closure for the tubular member 80, and having an opening 84 therethrough for the admission of a filtrate supply conduit 86 secured in and to the end plate 82 and communicating with a conduit portion 88 having jet nozzles 90 disposed therein and extending in alignment longitudinally of such portion. The conduit portion 88 is closed at its end, so that the filtrate introduced thereinto can issue only through the jet nozzles 90. The other end of the tubular member 80 is also closed by an end plate 92 having an opening 94 therethrough for communication with the member 80 and for securement of a suction conduit 96 leading to and connected with a pump 98 mounted upon the support plate 32, the pump being power driven by an electric motor 100.

The filter unit further comprises hubbed end plates 102, 104 which are mounted with bearings 106, 106 directly upon the tubular member 80. The hubbed end plate 102 is provided with an affixed drive sprocket 108. Secured to the inner faces of the hubbed end plates 102 and 104 are circular angle members 110, 110, having one leg mounted upon and attached to the end plates and the other leg projecting inwardly in alignment toward each other. Intermediate the angle members 110, 110 are a pair of similar circular angle members 112, 112, secured together in back-to-back relationship, the laterally extending legs of such angle members being aligned with the inwardly extending legs of the hubbed plate mounted members 110, 110. Gasket rings 113 are disposed between the intermedaite members 112, 112 and between the members 110 and the end plates 102 and 104, to seal them against leakage. Secured to the outer faces of the aligned legs of the members 110 and 112 are cylinders 114 made of perforated or expanded metal, providing a mechanical support for an outer layer or cylinder of very fine wire screen 116 performing the filtering function. This wire screen is preferably of very close mesh, or of coarser mesh as the requirements of a particular application may specify, one such application in the industrial automotive field requiring about a 325 mesh stainless steel wire screen, having openings of approximately 40 microns. Thus, upon such screen solid particles of 40 microns or more will be filtered, and will not be passed through the screen nor carried into the suction conduit 96.

The capacity of suction pump 98 is a design function determined by the requirements and specifications of a particular application. In order that the filter unit 14 operate at a relatively high level of efficiency, a relatively low flow rate through the filter screen 116 is desirable and required. This condition is met when the filter unit is designed for a flow rate of approximately twenty-five gallons of filtrate per minute through a square foot of the filter screen above specified. This rate of flow allows a low velocity through the screen and therefore a relatively low quantity and poor adhesion of filtered contaminants to the filter screen. If the contaminating solids are not too deeply imbedded in the screen pores, they are much more easily separated from the screen by the blast of filtrate discharged from the jet nozzles 90, and will tend to settle toward the bottom of the tank unit.

The supporting perforated or expanded metal grids 114 are secured directly upon the inwardly directed supporting legs of the angle members 110 and 112 by welding, or other suitable means. A band of neoprene rubber 118 is then placed upon the grids 114 at each leg (FIGURE 6), and cylinders of the filter screens 116 placed upon such bands 118. Second neoprene bands 120 are placed upon the filter screens, overlying the bands 118, and metal draw bands 122 tightened down upon the bands 120 to close the grids and screens firmly in sealing contact upon the inwardly directed legs of the angle members 110 and 112.

It will be noted in the sectional views illustrated in FIGURES 3 and 6 that the hubbed end plate 104 supports the member 110 by mounting screws 130 which are of a length substantially the same as the mounting screws 130 for the other circular support members 110 and 112. However, one screw 132, shown at the lower end of the hubbed plate 104 in FIGURE 3, is somewhat longer than the remaining screws used. This extra length provides engagement with the elongated angled arm 74 of the skimming device 36, illustrated in FIGURE 4. The arm 74 is arranged so that it lies closely adjacent the hubbed end plate 104 and in the path of the extended screw 132 which periodically engages the arm 74 during rotation of the filter unit and tilts the skimmer plate 60 on hinge 68 into the liquid (shown in broken lines in FIGURE 4). A counterbalance weight 134 at each end of the plate 60 causes the skimmer structure 36 to assume the attitude shown in solid lines in FIGURE 4 after the screw 132 has lost contact with the arm 74. A spring may be used in place of the counterbalance weights. For more frequent pivoting and tilting of skimmer plate 60 into the liquid, a second, or more screws 132 can be used on the end plate 104 for engagement with lever arm 74.

The direction of rotation of the filter unit 14, as shown in FIGURE 4, is clockwise, the extended screw 132 engaging the arm 74 from above and causing the skimmer plate 60 to pivot and tilt into the liquid and below the liquid level so that the floating contaminating materials can be picked up by the plate portion 64 and tossed or slid into the trough 34 upon return of the plate to its elevated position.

A chain drive 140 is mounted on the sprocket 108 and on the drive end of the motor-speed reducer unit 142 secured to the tank support plate 30. The tubular support member 80 is secured to a mounting pad 144, welded to each of the transverse beams 48, by a U-bolt 146 passed around the member 80 and through openings in the support pad adjacent each end of the member 80.

The tubular member 80 is provided with slotted openings 150 in the area of the expanded metal cylinders 114 for admission thereinto of filtrate which has been sucked through the filter screen 116. The jet nozzles 90 of the filtrate supply conduit portion 88 are directed to the inner surface of the filter screen cylinders 116, 116. Since the conduit portion 88 is disposed in the lower region of the filter, the contaminating material adhering to the outer surface of the filter screen 116 is more easily removed by the jets of filtrate directed from the nozzles 90 than would occur were the position of the conduit portion 88 at an elevated level. Filtrate for conduit 86 and 88 is taken from the discharge side of pump 98.

In order to reduce the turbulence occasioned by blasting streams of filtrate liquid from the nozzles 90 through the fine mesh filter screen 116, a velocity directional chute 240 is secured to and suspended from the beams 48, 48 by members 241, with the chute opening 242 extending in alignment and in register with the series of nozzles 90 but spaced slightly below and out of direct contact with the filter screen 116. The chute is formed of side walls 244, 244 disposed in an angular relationship to each other and forming an outwardly tapering channel for the solids and particles blown off of the filter screen by the filtrate discharged from the nozzles 90, the side walls each having an outwardly directed flange 246 arranged substantially in parallel, or concentric, with the filter screen 116; the chute further having a pair of end walls 248, 248 conforming to and conjoining the side walls at their ends. Thus, when the filter screen is cleaned by the blasts of filtrate, the solids will be directed by the chute 240 directly to the chip drag conveyor mechanism 16, and the surrounding liquid in tank unit 12 will remain relatively undisturbed, or if some turbulence does occur it will be of substantially lesser intensity. By this means the functional efficiency of the filter unit 14 will be improved, and the flow of particles to the filter screen from and through the tank opening 35 will be relatively direct.

The chip drag conveyor mechanism 16 which handles the discharge of solids of a size larger than the mesh openings of the filter screen 116 from the tank unit 12 comprises a pair of parallel chain drives 160, 160 disposed adjacent the bottom wall 22 at each side wall 20 and 24 and up the end wall 28, sprockets 162, 164 and 166 engaging the chain drives and rotatably supported on shafts 168, 170 and 172 respectively, the pair of angle member supports 44, 46 secured to the tank side walls 24 and 20 respectively for supporting an endless series of chip scrapers or flights 174 secured to the two chain drives 160, 160 across the width of the tank unit 12.

The sprockets 166 are fixedly secured to shaft 172 and operate as the drive sprockets for the mechanism 16, the sprockets 162 and 164 being bearing mounted idler sprockets on their respective shafts at each chain drive 160. Secured to an outboard end of shaft 172 is a drive gear 176 engaged by a belt or drive chain 178 which is driven by a motor and speed reducer gear set device 180 secured to and supported on a platform 182 disposed above the discharge end of the mechanism 16.

The chip scrapers or flights 174 are swept substantially free of adherent solids by a flight scraper device 190 (FIGURE 5), which comprises a pair of spaced apart lever arms 192 rotatably mounted on and secured to a shaft 194 mounted on the tank side walls 20 and 24, the lever arms being secured in spaced relationship on the shaft 194 by an angle member 196 to one leg of which the arms are attached, a pair of depending levers 198 secured to the other leg of the member 196, and a wiping bar 200 secured to the digital ends of the levers 198 and extending between the side walls 20 and 24 for contact with the chip scrapers 174 as they are carried upwardly by the chain drives 160, 160 driven by sprockets 166.

An end wall plate 210 secured to the right hand edges of side walls 20 and 24 (FIGURES 1 and 5) is spaced apart from the end wall 28 to define the chip discharge opening 33 through which the chips and solids carried upwardly by the flights 174 are discharged to catch tubs or vessels positioned therebelow.

The parts washing unit 18 is merely shown in outline form and does not constitute an integral part of the inventive filtering structure 10, as was indicated above. In this instance, the wash liquid issuing from the wash chamber 220 is admitted to the tank unit 12 through bottom entry 35 in side wall 24. However, such wash liquid can alternatively be supplied to the tank unit by a conduit from a wash unit 18 located at a position remote from the tank unit, or by a pump and conduit connected to a machine or other source of liquid supply, or by gravity flow from a position elevated above the tank unit, or by any other means.

The filtering structure 10 operates in the following manner. In the particular embodiment of the invention illustrated and described herein, the pump unit 98 is the sole supply device for the liquid used in the washer unit 18 and is the same pump that serves the filter unit 14. Therefore, both units are placed in operation simultaneously. With liquid flowing through the opening 35 and brought to liquid level in tank unit 12, liquid also flows through slots 50, 50 between the washer and tank units. Drive motor 142 is started, rotating filter unit 14; drive motor unit 180 is started, placing the chip drag conveyor device 16 in operation. The suction flow rate of the pump 98 at the filter screens 116 has been established at about 25 gallons per minute per square foot of filter screen area for wash liquids used on industrial and automotive parts.

A portion of the filtrate discharged by pump 98 is continually by-passed through a conduit (not shown) communicating with conduit 86 for pressurized discharge from the jet nozzles 90 against the inside surface of filter screens 116. The nozzles 90, being relatively closely aligned, project a jet of filtrate across the entire width of the screens to clean them substantially free of solids as the filter unit 14 rotates under the drive of motor-gear set 142 and chain drive 140.

Skimmer structure 36 is periodically actuated by engagement with one or more extended screws 132 as the filter unit 14 rotates and the screws engage level arm 74 to tilt the plate 60 under the level of liquid in the tank unit, which then scoops up and deposits the surface floating contaminants and entrained liquid into trough 34, from which it is then discharged through conduit 43 to a catch tub, floor drain or other means. The surface skimmer 36, in many instances, can and does function as a reclaiming device. Very often kerosene or other oils, or liquids of similar viscosities, are discharged into the tank unit and float on the surface of wash water that is the principal constituent of the liquid to be filtered. Sometimes, fine metallic solids or dusts will float on the liquid surface. All of these can be carried into the trough 34 by the skimmer plate 60, as it pivots down and tilts up again to discharge the surface floatants into the trough. If reclamation is desired, then the drain conduit 43 should be connected to some suitable tank or other device for the purpose of removing the reclaimable materials.

Simultaneously, as solids are being blown off of screens 116 by the filtrate coming through jet nozzles 90, they will settle to the bottom plate 22 of the tank unit. Chip scraper bars or flights 174, carried by chain drives 160, 160, pass along the bottom plate 22 and sweep the accumulated solids up the end wall 28 to the opening 33 through which most of these solids will fall. Those which adhere to the scraper bars 174 are wiped off by the action of the scraper device 190. As the flight 174 engages the depending wiping bar 200, the latter is pivoted upwardly on the pivot bar 194 and sweeps across the surface of the flight 174 which is being carried around the sprockets 166, to substantially clean the solids-propelling surface of the flight free of adherent solids.

In the structure illustrated and described, pump 98 is the single unit that serves both the filter structure 14 and the washer 18, whereby the liquid supply to the washer is the filtered liquid obtained from the filter 14. In other applications, the filtrate can be delivered to a supply tank from which it is then taken by a second pump, or by gravity or other means to the place or into the equipment requiring filtered liquid.

Having described the invention in its simplest terms, it is to be clearly understood that the above description of a single embodiment is illustartive of one form of the invention. The invention may be embodied in other specific forms without departing from the spirit or essential characteristics thereof. The scope of the invention is indicated by the appended claims, and all changes which come within the meaning and range of equivalency of the claims are therefore intended to be embraced therein.

I claim:
1. A filtering structure comprising, in combination:
    a filter tank unit into which liquid to be filtered is admitted,
    a rotatable filter mounted within said tank unit, said rotatable filter having a filter screen affixed to the periphery of the rotatable frame of said filter,
    first drive means connected to said filter to rotate said filter,
    said tank unit having an inclined surface sloping between the bottom of said tank unit and an elevated discharge opening provided in said tank unit,
    a conveyor scraper mechanism disposed within said tank unit and including at least one endless conveyor arranged adjacent the bottom of said tank unit and said inclined surface,
    a plurality of scraper elements affixed to and carried by said endless conveyor,
    second drive means operatively connected to said endless conveyor to move said endless conveyor and its associated scraper elements,
    said rotatable filter having
        a suction conduit communicating with the interior thereof and a filtrate supply conduit including a series of nozzles for directing high velocity jets of filtrate upon the inner surfaces towards the outer surfaces of said filter screen,
    pump means operatively connected to said suction conduit and said filtrate supply conduit,
    turbulence-reducing means mounted in said tank unit adjacent said filter screen and aligned with said series of nozzles,
    and a tiltable surface skimming device which operates in response to rotation of said rotatable filter to remove flotage from the surface of said liquid to be filtered,
    whereby said liquid is drawn through said filter screen of the rotating filter by suction created in the interior of said filter by means of said suction conduit and associated pump means, and particles adhering to the outer surfaces of said filter screen are removed therefrom by said high velocity jets which direct said particles through said turbulence-reducing means into the path of said scraper elements which remove particles accumulating on the bottom and sloping surface of said tank unit and discharging said particles through said particle discharge opening provided in said tank unit.

2. A filtering structure according to claim 1, including a scraper element wiping device rotatably mounted in said tank unit a predetermined distance above the highest portion of said conveyor scraper mechanism to wipe automatically each scraper element so as to remove any particles adhering to the propelling surface of said scraper element after said scraper element has moved past said particle discharge opening provided in said tank unit, and to cause the particles to exit via said discharge opening.

3. A filtering structure according to claim 2, wherein said scraper element wiping device comprises
    a pair of spaced apart lever members rotatably mounted on a shaft supported on the walls of said tank unit, and a wiping bar secured to the digital ends of said lever members and disposed for contact with said particle propelling surface of said scraper elements as they are carried upwardly by said endless conveyor.

4. A filtering structure according to claim 1, wherein said filter screen comprises a fine wire screen supported upon a cylindrical grid form of perforated or expanded metal, and resilient and metal bands firmly securing said filter screen and said grid form to the remaining structural portions of said rotatable filter.

5. A filtering structure according to claim 1, including an articles washing unit conjoined to said filter tank unit, a wall member between said washing unit and said filter tank unit having a bottom opening therebetween and at least one higher opening through which openings said liquid is admitted into said filter tank unit,
    said higher opening extending above and below a predetermined and relatively constant level of said liquid in said washing unit and said filter tank unit,
        whereby said liquid to be filtered passes primarily through said bottom opening to said filter and said flotage passes through said higher opening to said surface skimming device.

6. A filtering structure according to claim 5, wherein
    said surface skimming device is pivotally mounted on said filter tank unit adjacent said surface of said liquid and is periodically actuated by at least one extended element affixed to said rotatable filter,
    said surface skimming device being disposed in a predetermined location in said tank unit relative to said higher opening and to said rotatable filter so that said surface skimming device encounters the optimum of flotage on said liquid surface,
    and an open topped trough secured to said filter tank unit adjacent said surface skimming device to receive the discharge of flotage from said surface skimming device.

7. A filtering structure comprising, in combination:
    a tank into which liquid to be filtered is introduced,
    a rotatable cylinder filter drum completely submerged in said liquid in said tank and mounted at a fixed location in said tank,
    said filter drum having a filter screen forming at least part of the cylindrical surface thereof,
    first drive means operatively connected to said filter drum to rotate said drum,
    said tank being provided with a particle discharge opening positioned above the level of the liquid in the tank and with an inclined surface sloping between the bottom of said tank and said particle discharge opening,
    a chip drag scraper mechanism provided in said tank and having a pair of parallel endless chain drives disposed adjacent said bottom and said inclined surface of said tank,
    an endless series of scraper elements extending across the width of said tank and secured to said chain drives,
    second drive means operatively connected to said chain drives to move the same and their associated scraper elements,
    said filter drum having a non-rotatable suction conduit communicating with the interior thereof,
    said filter drum having a non-rotatable filtrate supply conduit including a plurality of nozzles for directing jets of filtrate vertically downward against the inside surface of said filter screen to dislodge particles adhering to said filter screen,
    pump means operatively connected to said suction conduit and said filtrate supply conduit,
    a turbulence-reducing directional chute affixed in said tank and aligned with said plurality of nozzles to direct said particles dislodged from said filter screen directly to said chip drag scraper mechanism without unduly disturbing the surrounding liquid,
    a surface skimming device pivotally secured to said tank near the liquid level and periodically actuated by one or more elements affixed to said rotatable filter drum for removing or reclaiming substances floating on the surface of said liquid,
        whereby the suction created in the interior of said filter drum draws the liquid through said filter screen of the rotating filter drum, and said chip drag scraper mechanism removes particles that have settled to the bottom of said tank and that have been blown to the bottom by said nozzles, by propelling such particles along the tank bottom and inclined surface to said particle discharge opening in said tank.

8. A filtering structure according to claim 7, including a scraper element wiping device rotatably mounted in said tank a predetermined distance above the highest portion of said drag scraper mechanism to wipe automatically each scraper element so as to remove any particles adhering to the particle propelling surface of said scraper element after said scraper element has moved past said particle discharge opening provided in said tank, and to cause the removed particles to exit via said discharge opening.

9. A filtering structure according to claim 8, wherein said scraper element wiping device comprises
a pair of spaced apart lever members rotatably mounted on a shaft supported on the walls of said tank,
and a wiping bare secured ot the digital ends of said lever members and disposed for contact with said particle propelling surface of said scraper elements as they are carried upwardly by said pair of parallel endless chain drives.

10. A filtering structure according to claim 7, wherein said filter screen comprises a fine wire screen supported upon a cylindrical grid form of perforated or expanded metal, and resilient and metal bands firmly securing said filter screen and said grid form to the remaining structural portions of said rotatable filter drum.

11. A filtering structure according to claim 7, including an articles washing unit conjoined to said tank,
a wall member between said washing unit and said tank having a bottom opening therebetween and at least one higher opening through which openings said liquid is introduced into said tank,
said higher opening extending a distance above and below a predetermined and relatively constant level of said liquid in said washing unit and said tank,
whereby said liquid to be filtered passes primarily through said bottom opening to said filter and said surface floating substances pass through said higher opening to said surface skimming device.

12. A filtering structure according to claim 11, wherein said surface skimming device is disposed in a predetermined location in said tank relative to said higher opening and to said rotatable filter drum so that said surface skimming device encounters the optimum of substances floating on said liquid surface,
and an open topped trough secured to said tank adjacent said surface skimming device to receive the discharge of said floating substances from said surface skimming device.

13. A filtering structure comprising, in combination,
a washing chamber supplying liquid to be filtered,
a tank unit conjoined to said washing chamber and into which tank unit said liquid is introduced,
a wall member common to said washing chamber and said tank unit and having a bottom opening and at least one higher opening through which openings said liquid passes,
said higher opening extending a predetermined distance above and below a predetermined and relativly constant level of said liquid in said washing chamber and said tank unit,
a cylindrical filter unit completely submerged in said liquid and rotatably mounted at a predetermined fixed location in said tank unit,
said filter unit including a filter screen forming a major portion of the cylindrical periphery thereof and at least one extended element,
first drive means operatively connected to said filter unit to rotate said filter unit,
said tank unit having an angularly disposed wall member slanting between the tank bottom and a solids discharge opening positioned above said liquid level,
a conveyor scraper mechanism disposed within said tank unit and including a pair of parallel endless chain drives located adjacent said tank bottom and said angularly disposed wall member,
a plurality of scraper elements each extending across the width of said tank unit and each affixed to and carried along by said endless chain drives,
second drive means operatively connected to said chain drives to move said chain drives and its affixed scraper elements along said tank bottom, up said angularly disposed wall member to said solids discharge opening, and back again to said tank bottom,
said bottom opening being so located and being of such shape and dimensions to ensure a high speed flow of liquid into said tank unit while removing the heavier solids contained in said liquid from said washing chamber and carrying said heavier solids into the path of said moving scraper elements,
a non-rotatable suction conduit operatively connected to and communicating with the interior of said rotatable filter unit,
a non-rotatable filtrate supply conduit extending into the interior of said rotatable filter unit and including a plurality of nozzles for directing jets of filtrate vertically downward against said filter screen so as to dislodge automatically and continuously solids that adhere to said filter screen,
pump means operatively connected to said suction conduit and said filtrate supply conduit,
a turbulence-reducing directional chute rigidly secured in said tank unit adjacent said rotatable filter unit and aligned with said plurality of nozzles to guide said solids dislodged from said filter screen directly into the path of said moving scraper elements without significant disturbance of the surrounding liquid,
a suface skimming device pivotally secured to said tank unit adjacent said predetermined liquid level and periodically actuated by each said extended element of said rotatable filter unit to remove substances floating on the liquid surface,
said surface skimming device being disposed in a predetermined location in said tank unit relative to said common wall member higher opening and to said filter unit so that said surface skimming device encounters the optimum of substance floating on said liquid surface,
whereby said liquid to be filtered is drawn through said filter screen of said rotatable filter unit in response to suction created within the interior of said filter unit by said pump means and associated suction conduit, and said conveyor scraper mechanism moves solids in its path along said tank bottom and up said angularly disposed wall member for removal through said solids discharge opening.

14. A filtering structure according to claim 13, including a scraper element wiping device rotatably mounted in said tank unit a predetermined distance above the highest portion of said conveyor scraper mechanism to wipe automatically each scraper element so as to remove any solids adhering to the particle propelling surface of said scraper element after said scraper element has moved past said solids discharge opening provided in said tank unit, and to cause the removed solids to exit via said discharge opening.

15. A filtering structure according to claim 14, wherein said scraper element wiping device comprises
a pair of spaced apart lever members rotatably mounted on a shaft connected to the walls of said tank unit,
and a wiping bar secured to the digital ends of said lever members and disposed for contact with said particle propelling surface of said scraper elements as they are carried upwardly by said pair of parallel endless chain drives.

16. A filtering structure according to claim 13, wherein said filter screen comprises a fine wire screen supported upon a cylindrical grid form of perforated or expanded metal, and resilient and metal bands firmly securing said filter screen and said grid form to the remaining structural portions of said rotatable filter unit.

17. A filtering structure according to claim 13, including an open topped trough secured to said filter tank unit adjacent said surface skimming device to receive the discharge of said floating substances from said surface skimming device.

References Cited

UNITED STATES PATENTS 3,206,030  9/1965  Estabrook _____ 210—391 X

SAMIH N. ZAHARNA, *Primary Examiner.*